United States Patent [19]

Tomb

[11] Patent Number: 5,256,858
[45] Date of Patent: Oct. 26, 1993

[54] MODULAR INSULATION ELECTRICALLY HEATED BUILDING PANEL WITH EVACUATED CHAMBERS

[76] Inventor: Richard H. Tomb, 130 Davis St., Painted Post, N.Y. 14870

[21] Appl. No.: 752,076
[22] Filed: Aug. 29, 1991
[51] Int. Cl.⁵ .............................................. H05B 1/00
[52] U.S. Cl. ................................ 219/213; 392/435; 52/791; 52/788; 52/407; 165/49
[58] Field of Search ............... 219/213; 392/435–439; 52/791, 788, 407, 408, 307, 308, 173 R, 612; 338/307–309; 165/49, 135–136

[56] References Cited

U.S. PATENT DOCUMENTS

| | | |
|---|---|---|
| Re. 29,517 | 1/1978 | Becker ........................... 52/173 R |
| 1,770,200 | 7/1930 | Constock ............................ 52/791 |
| 2,545,805 | 3/1951 | Callender ............................ 392/438 |
| 2,637,530 | 5/1953 | Janos .................................... 165/136 |
| 3,057,989 | 10/1962 | Needham ........................... 219/213 |
| 4,032,751 | 6/1977 | Youtsey et al. .................... 338/308 |
| 4,531,511 | 7/1985 | Hochberg ........................... 165/135 |

Primary Examiner—Bruce A. Reynolds
Assistant Examiner—John A. Jeffery
Attorney, Agent, or Firm—Howard J. Greenwald

[57] ABSTRACT

An insulating, substantially rectilinear, laminated building panel containing a reflective outer layer, an intermediate shatter shield, and an inner insulating layer. The inner insulating layer consists essentially of soda-lime glass, and it contains at least three evacuated chambers with reflective interior surfaces.

20 Claims, 5 Drawing Sheets

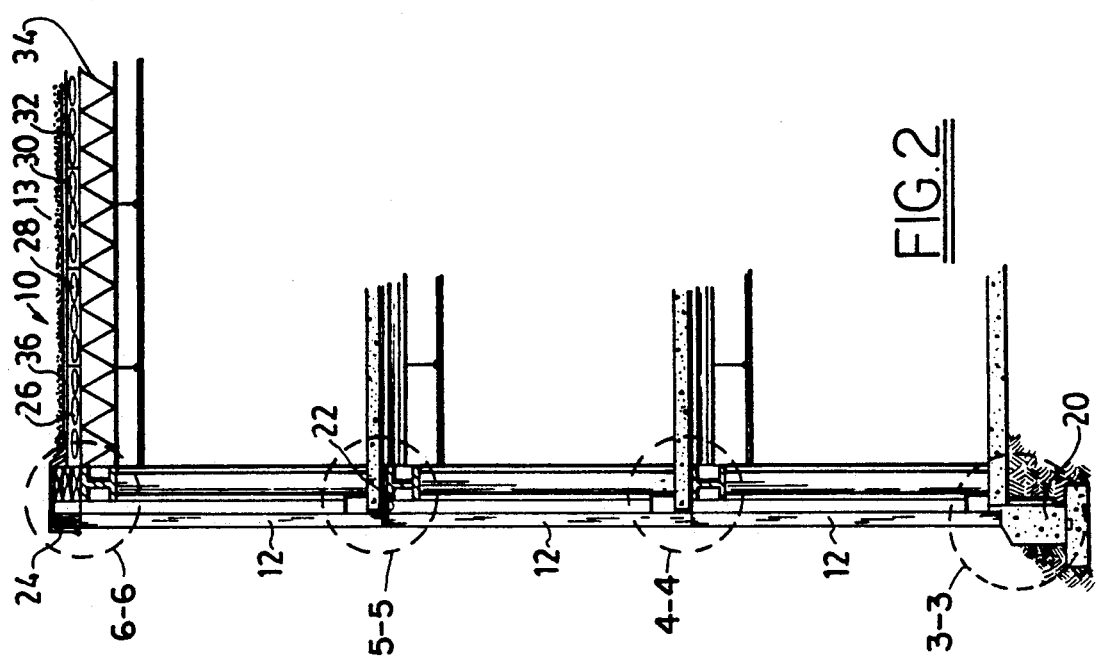
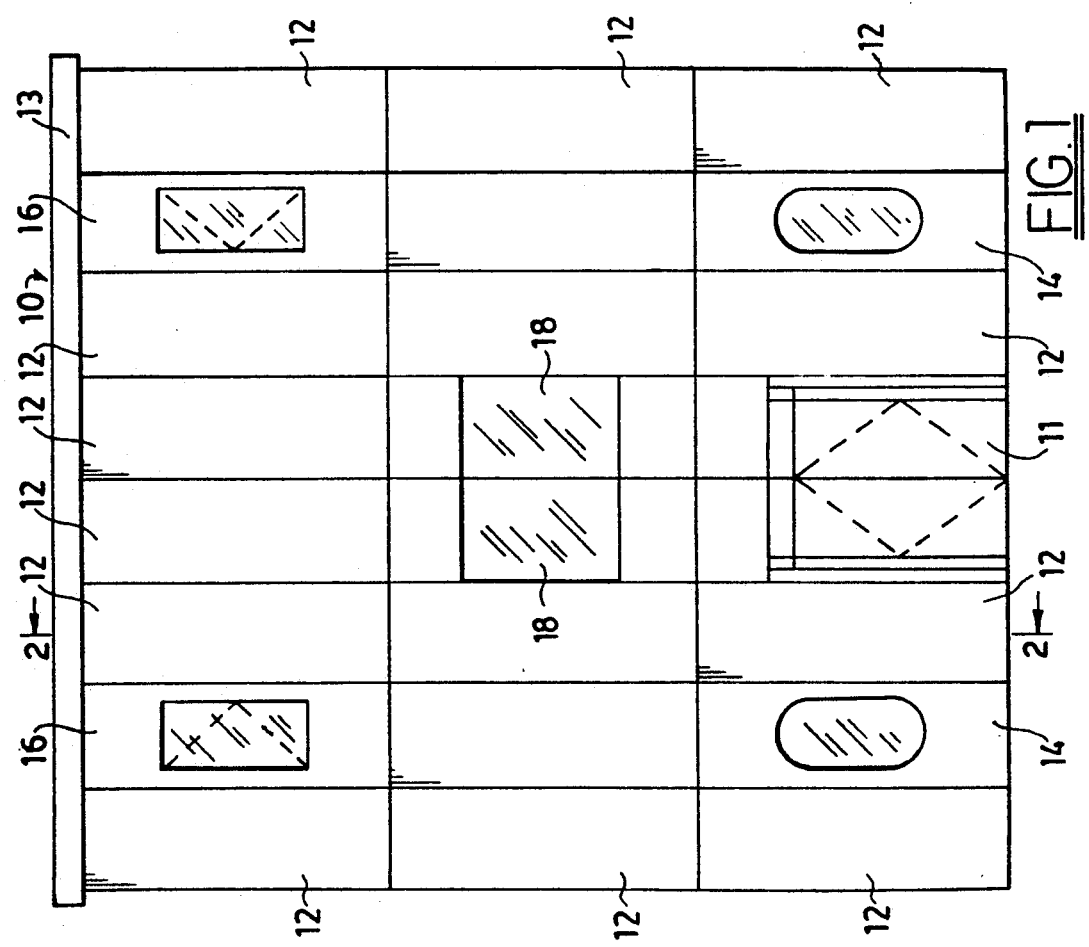

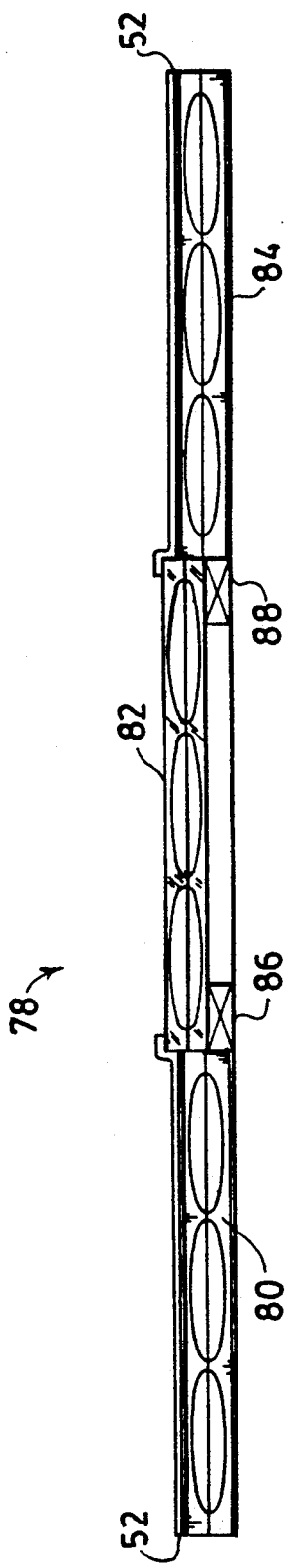
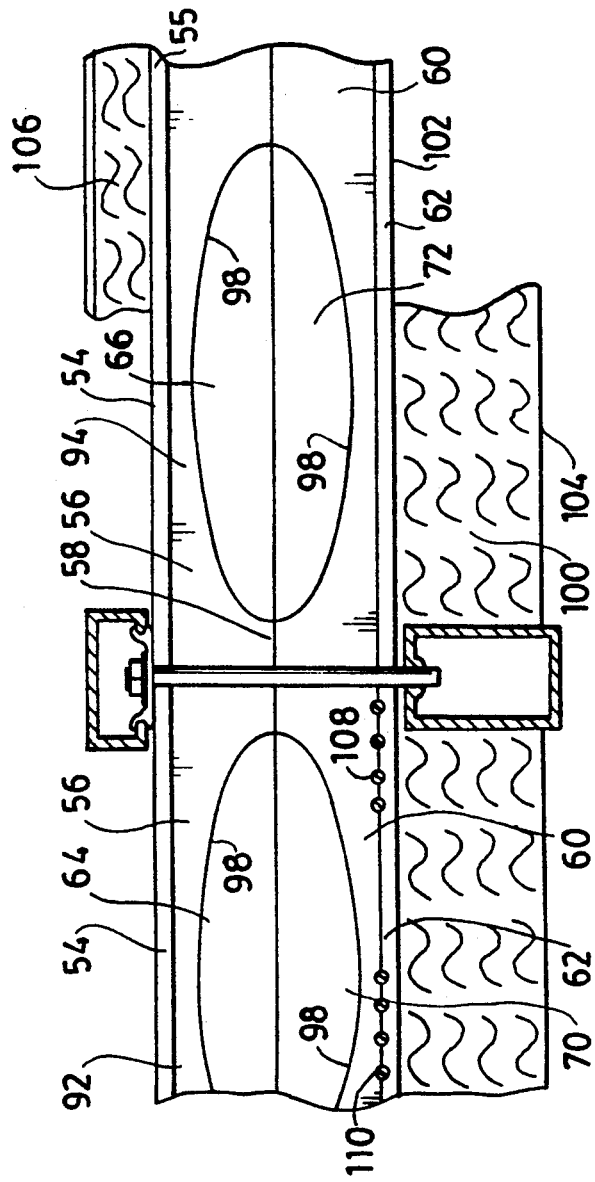
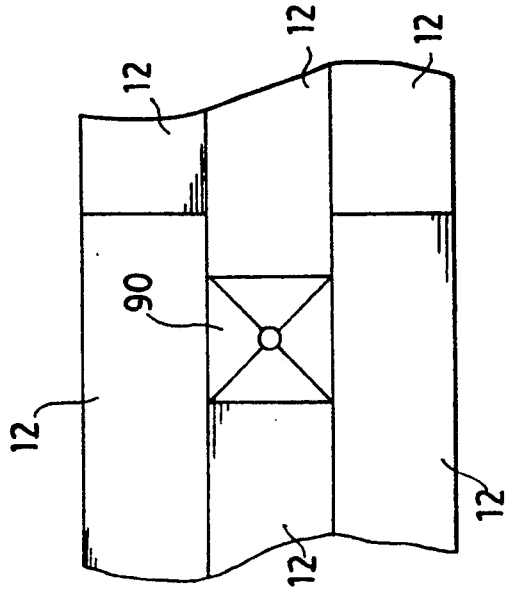
FIG. 9
FIG. 11
FIG. 10

MODULAR INSULATION ELECTRICALLY HEATED BUILDING PANEL WITH EVACUATED CHAMBERS

FIELD OF THE INVENTION

A composite building panel which contains a pressed, laminated glass center layer and a reflective outer layer.

BACKGROUND OF THE INVENTION

Composite building panels containing laminated glass are known to those skilled in the art; these panels are often referred to as "insulating glass," and they often contain two layers of glass separated by an air space.

However, the prior art building panels generally have a relatively low insulating value.

It is an object of this invention to provide a composite building panel which has a relatively high insulating value.

It is another object of this invention to provide a composite building panel which is relatively inexpensive to produce.

It is yet another object of this invention to provide a building panel which can be decorated with a variety of different effects.

It is yet another object of this invention to provide a building panel with improved durability properties.

It is yet another object of this invention to provide a building panel equipped with heating means.

It is yet another object of this invention to provide a process for preparing the building panel of this invention.

In accordance with this invention, an insulating, substantially rectilinear, laminated building panel containing a reflective outer layer, a shatter shield bonded to the reflective outer layer, and an insulating inner layer bonded to the shatter shield, is disclosed.

The insulating layer consists of glass containing 66-75 weight percent of silica, 5-12 weight percent of calcium oxide, and 8-17 weight percent of sodium oxide; and it contains at least three evacuated chambers, each of which extends at least about 95 percent of the length of the insulating layer.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 1 is an elevational view of a building comprised of several embodiments of the building panel of this invention;

FIG. 2 is a sectional view of the building of FIG. 1, taken along lines 2—2;

FIG. 9 is sectional view of a roof deck structure containing a skylight and the building panel of this invention;

FIG. 10 is a top view of a roof drain which may be used in the structure of FIG. 9;

FIG. 11 is a partial sectional view of two of the building panels of this invention joined together.

DESCRIPTION OF THE PREFERRED EMBODIMENTS

Figure 3:
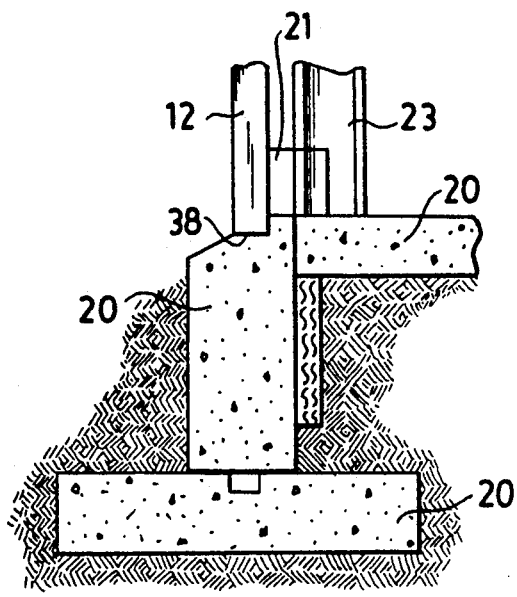
FIGS. 3, 4, 5, and 6 are partial views of the foundation, the floor, another floor, and the roof, respectively, of the building of FIG. 1, each of which is taken along lines 2—2.

FIG. 1 is an elevational view of a building 10 which contains door 11, roof 13, and the building panels 12, 14, 16, and 18 of applicant's invention. It will be apparent that applicant's building panel can be made in a variety of sizes, shapes, and appearances.

FIG. 2 is a sectional view of the building 10 of FIG. 1, taken along lines 2—2. Referring to FIG. 2, it will be seen that the building panel 12 is either contiguous with concrete foundation 20 and/or is stacked upon the end of another building panel and/or is contiguous with lintel 22 and/or is disposed within fascia 24. It will also be seen that roof structure 13, in this embodiment, is comprised of panels 26, 28, 30, and 32 which rest upon bar joist 34 and are covered by rubber fabric and stone ballast 36.

FIG. 3 illustrates how building panel 12 may be connected to a concrete foundation 20, which, in this embodiment, is attached to steel beam column 23. Referring to FIG. 3, it will be seen that the bottom surface 38 of building panel 12 is contiguous with concrete foundation 20; and it is also contiguous with false baseboard 21. At the point at which bottom surface 38 touches foundation 20, it is preferred to interpose between such surfaces a waterproofing agent to prevent moisture from seeping from the foundation 20 into building panel 12. Any of the waterproofing agents known to those skilled in the art may be interposed between such surfaces. In one preferred embodiment, a silicone waterproofing agent is spread onto the surface of foundation 20 prior to the time the building panel is placed thereon. As is known to those skilled in the art, silicones are a group of resinlike materials in which silicon takes the place of the carbon of the organic synthetic resins. See, for example, pages 730-733 of George S. Brady's "Materials Handbook," Twelfth Edition (McGraw-Hill Book Company, New York, 1986). Thus, by way of illustration, one may use silicone rubber, "SILASTIC" (a silicone resin sold by Dow Corning), butyl rubber, polysufides, other elastomeric materials, and the like.

Figure 4:
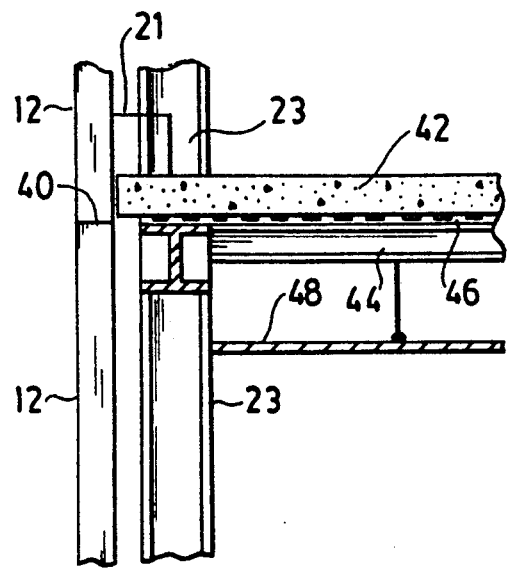

FIG. 4 is a partial sectional view showing two building panels 12 contiguous with each other at stack joint 40. It is preferred that a waterproofing agent, such as the silicone resin described above, be interposed between the ends of building panels 12. It will be seen that, in the embodiment of FIG. 4, concrete deck 42 preferably is not contiguous with building panel 12. In the building structure illustrated in FIG. 4, the structure is comprised of steel beam 44, decking 46, dropped ceiling 48, and steel column 23. It will be apparent to those skilled in the art that many other building structures may utilize applicant's preferred building panel 12.

Figure 5:
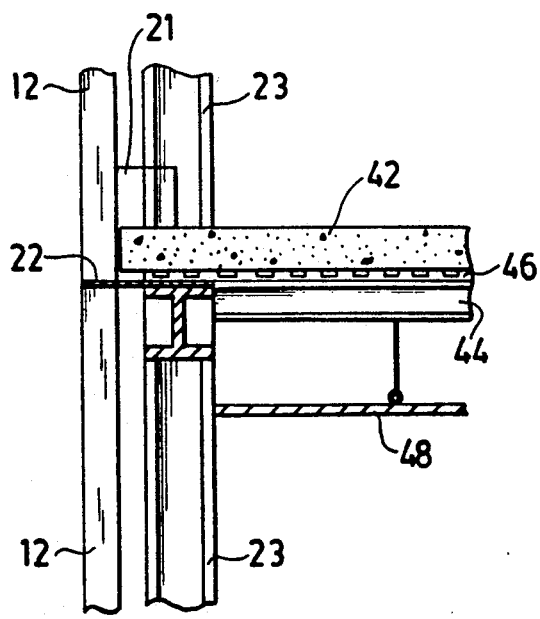

FIG. 5 illustrates another means of joining applicant's building panels 12. In the embodiment illustrated in FIG. 5, the building panels 12 are separated by lintel 22. It is also preferred, in this embodiment, that a waterproof seal be formed at the juncture of each of the surfaces of building panel 12 and lintel 22. Thus, the silicone rubber described above may be used to produce such a waterproof lintel joint.

Figure 6:
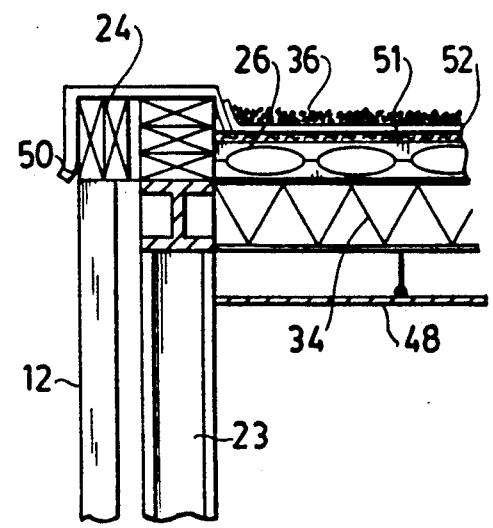

Typical means for connecting the building panel 12 to a roof structure are illustrated in FIG. 6. Referring to FIG. 6, it will be seen that top end 50 of building panel 12 is disposed within fascia blocking 24 but is not necessarily contiguous therewith; it is stacked on the lower building panel 12 (see FIG. 11) and also may be attached to the lower panel 12 by vertical mullions (also see FIG. 11). It will also be seen that horizontally-extending building panel 26 is contiguous with bar joist 34.

Referring again to FIG. 2, it will be seen that horizontally-extending building panel 26 is contiguous with horizontally-extending building panel 28, which in turn is contiguous with building panel 30, which in turn is contiguous with building panel 32. At the points of contiguity of these panels, it is preferred to interpose waterproofing agent, such as the aforementioned silicone rubber.

Referring again to FIG. 6, it is preferred that the rubber roof/ballast combination be comprised of insulating layer 51, elastomeric membrane 52, and stone ballast 54. In one preferred embodiment, stone ballast 54 is comprised of white stone, which has low emissivity and high reflectivity.

Figure 7:
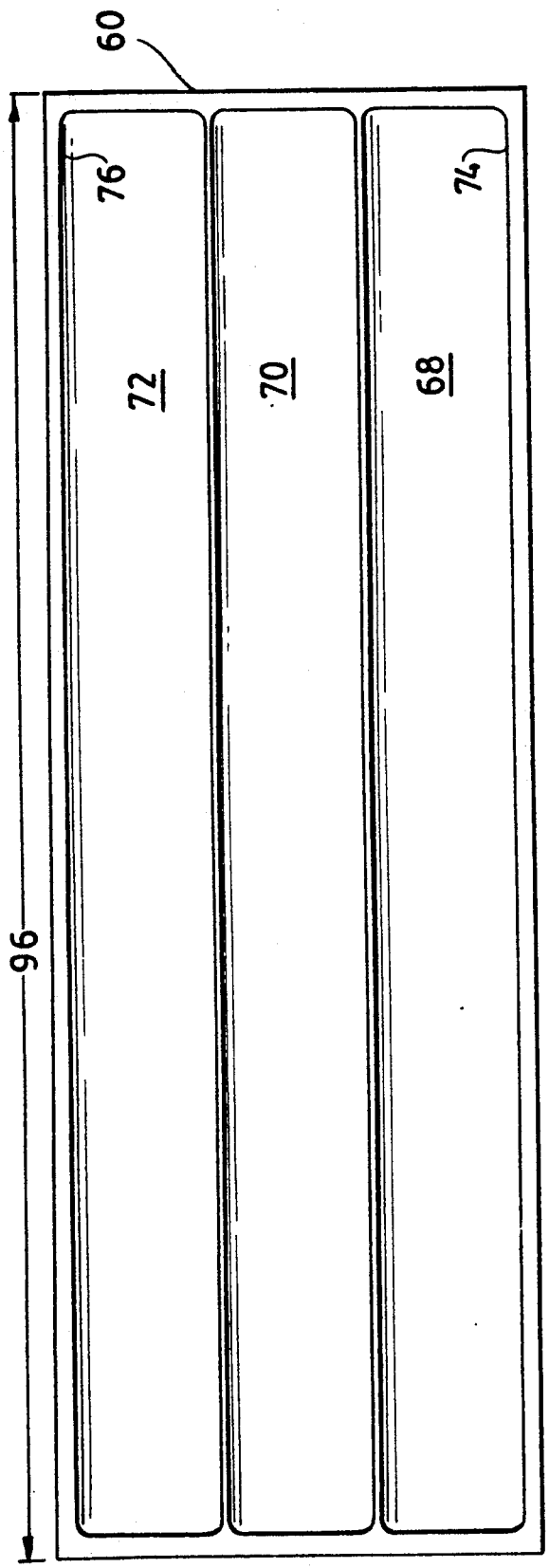
FIG. 7 is a sectional view of a portion of one preferred building panel of this invention.
Figure 8:
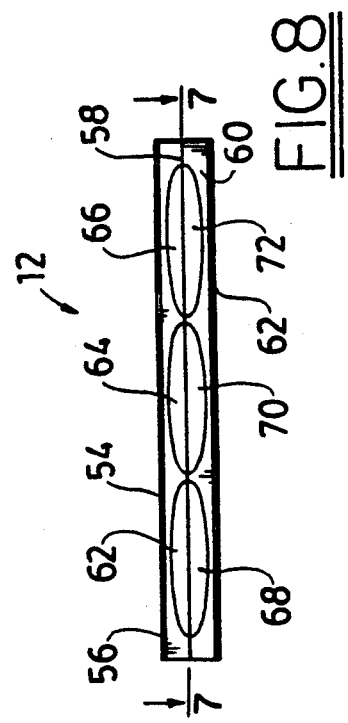
FIG. 8 is another sectional view of a preferred building panel of this invention.

FIG. 8 is a sectional view of one preferred embodiment of building panel 12. Referring to FIG. 8, it will be seen that building panel 12 is comprised of reflective material 54, glass layer 56, binder 58, glass layer 60, and safety shield 62. The glass layers 56 and 60 are comprised of depressions 62, 64, 66, 68, 70, and 72. Referring to FIG. 7, it will be seen that, in the embodiment depicted in FIGS. 7 and 8, the depressions 68, 70, and 72 are preferably contiguous with each other and form a substantially continuous arcuate surface from point 74 to point 76.

FIG. 9 illustrates a roof deck/skylight structure 78 comprised of building panels 80, 82, and 84, elastomeric membrane 52, and wood blocking 86 and 88. In this embodiment, building panel 82 is so designed that it is transparent and light is allowed to pass through it.

FIG. 10 illustrates a built-up roof drain section 90 attached to different lengths and/or sizes of building panels 12. Any of the roof drain assemblies 90 known to those skilled in the art may be used.

FIG. 11 is a cross-sectional view of one preferred embodiment of a structure comprised of building panel 92 joined to building panel 94. Referring to FIG. 11, it will be seen that each of building panels 92 and 94 is preferably comprised of reflective material 54, glass layer 56, binder 58, glass layer 60, and safety shield 62.

As is illustrated in FIG. 11, each of the building panels of this invention is preferably comprised of a reflective layer. In the embodiment illustrated in FIG. 11, reflective layer 54 is an outer layer. In other embodiments, not shown, the reflective layer 54 may be an inner layer. Thus, by way of illustration, where the glass used in the building panel is a patterned glass, it is preferred that such glass be used as the outer layer, and that the reflective material be used as an inner layer.

The reflective material 54, regardless of whether it is used as an inner or outer layer, preferably has a reflectivity of from about 40 to about 100 percent. As used in this specification, the term reflectivity refers to the ratio of the intensity of the total radiation reflected from a surface to the total radiation incident on that surface.

Any material 54 which produces the desired degree of reflectivity may be used. Thus, by way of illustration, one may use a metal or metallic oxide coating such as silver, tungsten oxide, chrome, and the like. In one preferred embodiment, silver is used.

In one preferred embodiment, reflective material 54 is deposited onto glass 56 by either wet deposition, vacuum deposition, or pyrolytic deposition; these techniques are described on ages 12-4 to 12-5 of George W. McLellan et al.'s "Glass Engineering Handbook," Third Edition (McGraw-Hill Book Company, New York, 1984).

In one embodiment, silver is deposited onto the surface of glass 56 by vacuum deposition. As is known to those skilled in the art, this procedure requires a vacuum chamber in which the metal to be deposited is heated by a filament. skilled in the art, this procedure requires a vacuum chamber in which the metal to be deposited is heated by a filament. In the vacuum, particles of the metal circulate freely and impinge upon the surface of the glass.

Referring again to FIG. 11, reflective layer 54 (which is comprised of a reflective coating and glass) is preferably joined to glass layer 56 by adhesive means.

Any adhesive means known for joining one glass surface to another may be used to bind reflective layer 54 to glass layer 56. Thus, by way of illustration, one may use polyvinyl butyrate, film adhesives, hot melt adhesives such as epoxies, phenolics, elastomers, polyamides, and the like. See, for example, pages 753 to 813 of Joel Frados' "Plastics Engineering Handbook," Fourth Edition (Van Nostrand Reinhold Company, New York, 1976).

In one preferred embodiment, polyvinyl butyrate is used as a binder to join reflective glass assembly 54 to glass assembly 56.

The glass layer 56, in addition to being adhesively joined to reflective layer 54, also may be adhesively joined to glass layer 60 with the use of binder/adhesive 58. One may use the same adhesive as is used to join glass layer 56 to glass layer 54 and/or different adhesive.

Each of glass layers 56 and 60 is comprised of at least three depressions which, preferably are dome-shaped and/or are comprised solely of arcuate surfaces; thus, see FIGS. 7 and 8, wherein depressions 62, 64, and 66 are illustrated in glass layer 56. Referring to FIG. 7, it will be seen that these depressions extend at least 95 percent of the length of the building panel 12. The building panels 12 are preferably rectangularly shaped.

The interior surfaces 98 of the depressions 62, 64, 66, 68, 70, and 72 are preferably coated with a reflective material such that said interior surfaces have a reflectivity of at least 80 percent.

In the preferred embodiment illustrated in FIG. 11, when glass surface 56 is joined to glass surface 60, depressions 62, 64, 66, 68, 70, and 72 are so shaped and aligned that the glass structure so formed contains at least three chambers, each of which has a reflective inner surface and each of which extends substantially at least about 95 percent of the length of the building panel. After said chambers are formed, they are preferably evacuated to a pressure of less than about 100 microns of mercury and, more preferably, less than about 10 microns of mercury. In one especially preferred embodiment, the chambers are evacuated to a pressure of less than about 5 microns of mercury.

In one preferred embodiment, illustrated in FIG. 11, the building panel 12 of this invention also is comprised of a layer 62 of either glass and/or ceramic material so that, if layer 60 were to fail, layer 62 would hold it together. It is preferred, in this embodiment, to join layer 62 to layer 60 by the adhesive means described above, thereby forming a laminated glass substructure.

In one preferred embodiment, illustrated in FIG. 11, the building panel is contiguous with insulating material 100 which is disposed between the outer surface 102 of layer 62 and the inner surface of sheet rock material 104.

In addition to putting insulation 100 against layer 62, or alternatively, one may put insulation 106 against the outer surface of reflective layer 56 and/or layer 54.

In one preferred embodiment, illustrated in FIG. 11, heating means 108 and 110 may be disposed within the interface between the outer surface of glass layer 60 and the inner surface of protective layer 62. Alternatively, or additionally, said heating means 108 and/or 110 may be disposed at the interfaces between other layers that are adhesively joined.

Any heating means known to those skilled in the art may be used as heating means 108 and 110. In one preferred embodiment, heating means 108 and/or 110 are, high-resistance, wires, which are electrically connected to a source of current.

Process for preparing the evacuated wall

Figure 12:
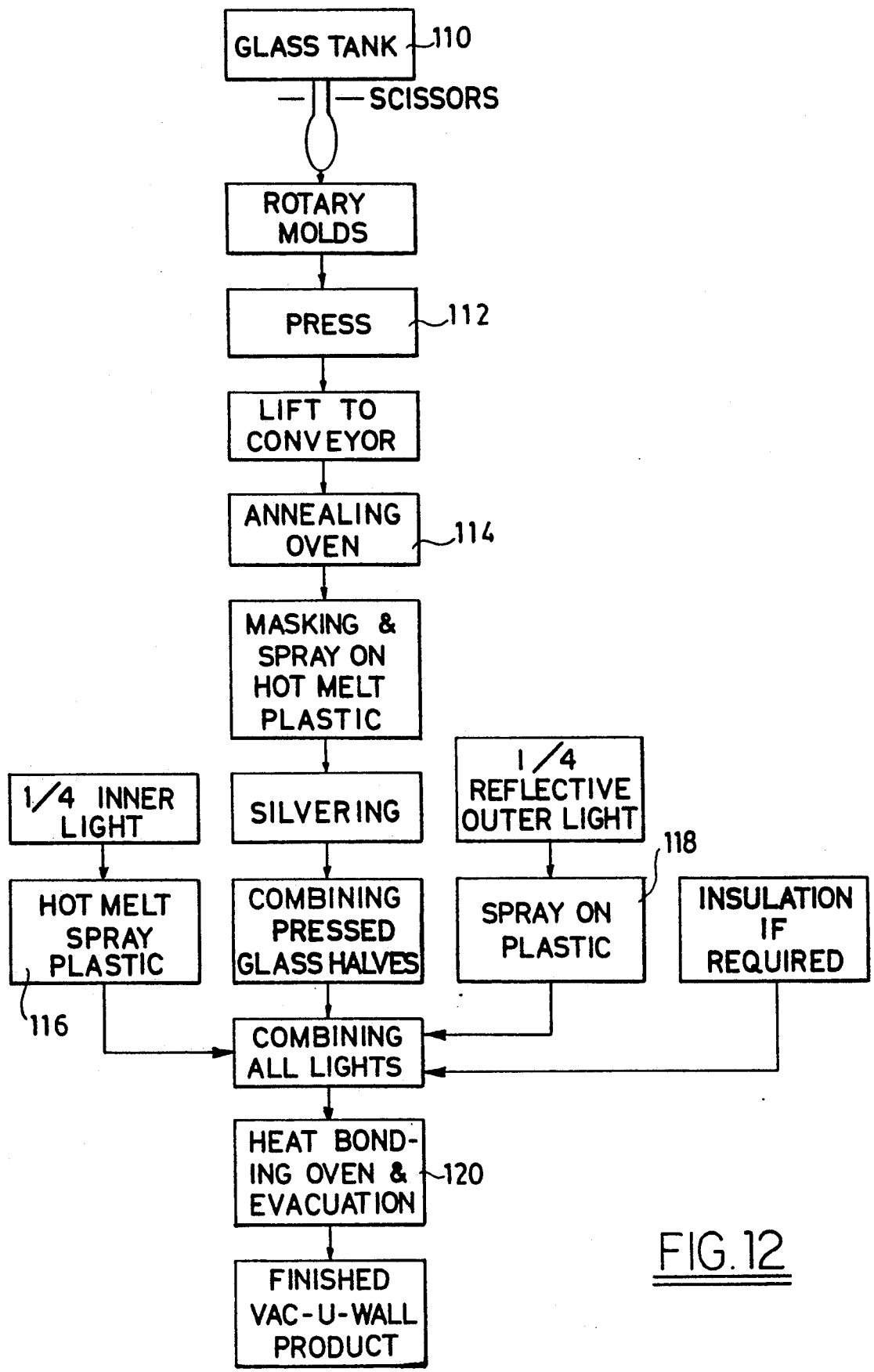
FIG. 12 is a flow chart illustrating a preferred process for preparing the building panel of this invention.

FIG. 12 is a flow diagram illustrating one preferred process for preparing the evacuated building panel of this invention. In general, the glass melting, forming, annealing, silvering, and other operations described in this flow diagram are well known to those skilled in the art and are described in, e.g., the aforementioned "Glass Engineering Handbook."

Referring to FIG. 12, a suitable glass batch is prepared in glass tank 110. It is preferred that the batch materials be adequate to prepare a glass such as soda-lime glass and/or borosilicate glass and/or Pyroceram and/or a low-expansion glass and/or ceramic material.

In one preferred embodiment, the glass made is a soda-lime glass. These glasses generally contain from about 66 to about 75 weight percent of silica, from about 5 to about 12 weight percent of calcium oxide, and from about 8 to about 17 weight percent of sodium oxide.

In another preferred embodiment, the glass made is a borosilicate glass. These glasses usually contain from about 11 to about 19 weight percent of boric oxide and from about 64 to about 81 weight percent of silica.

In another preferred embodiment, the glass made is "PYROCERAM BRAND 9608," which is a crystalline ceramic material made from glass by controlled nucleation; this material is sold by Corning, Inc. of Corning, N.Y. It has a density of 2.5, a softening temperature of 1,250 degrees Celsius, a specific heat of 0.19 (at 25 degrees Celsius), and a Knoop hardness of 703 (100 grams).

Referring again to FIG. 12, the glass batch is melted in glass tank 110, cut into appropriate globs, and deposited into rotary molds. The rotary molds are shaped to form the glass layers 56 and 60 with the arcuate depressions 62, 64, 66, 68, 70, and 72.

A press 112 presses the molten glass mass into the rotary molds. As the rotary molds rotate, they are preferably contacted with cooling steam, thereby forming the glass bodies.

The glass bodies are lifted out of the rotary molds onto a conveyor and thereafter passed to an annealing oven, in which they are usually annealed for a period of at least about 1 hour at a temperature of at least about 600 to about 1,200 degrees Fahrenheit.

The annealed glass is then adhesively joined to other layers. The surfaces to be joined are contacted with adhesive (such as hot melt plastic). Thereafter, the depressions formed in the inner surfaces of the glass layers are silvered by conventional techniques.

The reflective glass assembly 54 (referred to as "¼ inner light") and the safety glass layer 62 (referred to as "¼ outer light") may also be prepared and contacted with adhesive means, such as hot melt spray plastic and/or spray on plastic 118. Thereafter, as shown in FIG. 11, the various layers are aligned and pressed together and, after being so pressed, are heated in heat bonding oven 118.

Other embodiments of the building panel of this invention

In another preferred embodiment, a building panel is provided which is substantially identical to the building panel described in FIG. 11 with the exception that it does not contain reflective glass assembly 54. In this embodiment, glass assembly 56 and/or glass assembly 60 each consist essentially of glass and/or ceramic material which has a coefficient of expansion of less than about $4.0 \times 10^{-6}$ inches per inch per degree Fahrenheit and, preferably, less than about $2.5 \times 10^{-6}$ inches per inch per degree Fahrenheit. Some suitable materials include borosilicate glass, "PYROCERAM," and the like.

In another embodiment, one or more of the glass layers is comprised of textured glass, which is often referred to as rolled glass. As is known to those skilled in the art, and as is disclosed on page 12–7 of said "Glass Engineering Handbook," rolled glass is often produced with a pattern in one surface and may be used for ceiling light panels. The pattern in the glass may contain prisms to reflect and direct the light. The glass may be opal glass, to diffuse rather than direct the light.

In one embodiment, the building panel of this invention has an R value of at least about 12. As is known to those skilled in the art, the R value of a material may be determined from the formulae $Q = A(K/L) \times dt$, and $R = L/K$, wherein Q is the total heat transferred (in British thermal units per hour), A is the area of the building panel (in square feet), K is the conductivity of the panel being tested (in British thermal units per square foot per degree Fahrenheit), L is the thickness of the panel (in inches) and dt is the temperature differential across the panel (in degrees Fahrenheit).

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. An insulating, substantially rectilinear laminated building panel comprised of a reflective outer layer adhesively joined to a first surface of an insulating inner layer, and a shatter shield bonded to a second surface of said insulating inner layer, wherein:

(a) said reflective outer layer has a reflectivity of from about 40 to about 100 percent;

(b) said insulating layer consists essentially of glass which is comprised of from about 66 to about 75 weight percent of silica, from about 5 to about 12 weight percent of calcium oxide, and from about 8 to about 17 weight percent of sodium oxide; and (c) said insulating layer is comprised of at least three chambers containing interior surfaces, each of which extends at least about 95 percent of the length of the insulating layer, wherein:
1. the pressure within each of said chambers is less than about 100 millimeters of mercury, and
2. each of said interior surfaces has a reflectivity of at least about 80 percent.

2. The insulating building panel as recited in claim 1, wherein said reflective outer layer is comprised of a glass surface coated with a reflective material.

3. The insulating building panel as recited in claim 2, wherein said reflective material is silver.

4. The insulating building panel as recited in claim 1, wherein said reflective outer layer is adhesively joined to said insulating inner layer by a film of plastic.

5. The insulating building panel as recited in claim 1, wherein each of said chambers is substantially dome-shaped.

6. The insulating building panel as recited in claim 1, wherein said building panel is substantially in the shape of a rectangle.

7. The insulating building panel as recited in claim 1, wherein said building panel is substantially in the shape of a square.

8. The insulating building panel as recited in claim 1, wherein the pressure within each of said chambers is less than about 10 millimeters of mercury.

9. The insulating building panel as recited in claim 1, wherein the pressure within each of said chambers is less than about 1 millimeter of mercury.

10. The insulating building panel as recited in claim 1, wherein said building panel is comprised of a heating means which is contiguous with said insulating inner layer.

11. The insulating building panel as recited in claim 10, wherein said heating means is comprised of wire.

12. The insulating building panel as recited in claim 2, wherein said glass in said reflective outer layer consists essentially of glass which is comprised of from about 66 to about 75 weight percent of silica, from about 5 to about 12 weight percent of calcium oxide, and from about 8 to about 17 weight percent of sodium oxide.

13. The insulating building panel as recited in claim 12, wherein said reflective material is silver.

14. The insulating building panel as recited in claim 14, wherein said reflective outer layer is adhesively joined to said insulating inner layer by a film of plastic.

15. The insulating building panel as recited in claim 14, wherein each of said chambers is substantially dome-shaped.

16. The insulating building panel as recited in claim 14, wherein said building panel is substantially in the shape of a rectangle.

17. The insulating building panel as recited in claim 14, wherein said building panel is substantially in the shape of a square.

18. The insulating building panel as recited in claim 15, wherein the pressure within each of said chambers is less than about 10 millimeters of mercury.

19. The insulating building panel as recited in claim 15, wherein the pressure within each of said chambers is less than about 1 millimeter of mercury.

20. The insulating building panel as recited in claim 19, wherein said building panel is comprised of a heating means which is contiguous with said insulating innerlayer.

* * * * *